United States Patent
Steele et al.

(10) Patent No.: US 10,066,738 B2
(45) Date of Patent: Sep. 4, 2018

(54) METHOD OF CONTROLLING A TRANSMISSION DURING HIGH G-FORCE MANEUVERS

(71) Applicant: GM GLOBAL TECHNOLOGY OPERATIONS LLC, Detroit, MI (US)

(72) Inventors: Russell K. Steele, Clinton Township, MI (US); Daniel J. Davis, Novi, MI (US); Peter Kung Chiang, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 14/974,740

(22) Filed: Dec. 18, 2015

(65) Prior Publication Data

US 2017/0175881 A1 Jun. 22, 2017

(51) Int. Cl.
| | |
|---|---|
| F16H 57/04 | (2010.01) |
| F16H 61/00 | (2006.01) |
| F04B 49/22 | (2006.01) |
| F16H 59/44 | (2006.01) |
| F16H 59/48 | (2006.01) |
| F04B 49/06 | (2006.01) |

(52) U.S. Cl.
CPC ......... *F16H 61/0021* (2013.01); *F04B 49/06* (2013.01); *F04B 49/225* (2013.01); *F16H 57/0443* (2013.01); *F16H 57/0446* (2013.01); *F16H 59/44* (2013.01); *F16H 59/48* (2013.01); *F16H 2061/0037* (2013.01)

(58) Field of Classification Search
CPC .. F16H 57/0443; F16H 57/0446; F16H 59/44; F16H 59/48; F16H 61/0021; F16H 2061/0037
See application file for complete search history.

(56) References Cited

U.S. PATENT DOCUMENTS

| | | | | |
|---|---|---|---|---|
| 6,306,061 | B1 * | 10/2001 | Inamura | F16H 61/14 477/45 |
| 2009/0238696 | A1 * | 9/2009 | Satake | B60W 10/06 417/34 |
| 2009/0280952 | A1 * | 11/2009 | Grethel | F16H 61/0031 477/46 |
| 2014/0100079 | A1 * | 4/2014 | Schubert | B60K 17/356 477/52 |

FOREIGN PATENT DOCUMENTS

| | | |
|---|---|---|
| CN | 101535687 A | 9/2009 |
| CN | 102574521 A | 7/2012 |

* cited by examiner

*Primary Examiner* — Edwin A Young
(74) *Attorney, Agent, or Firm* — Quinn IP Law

(57) ABSTRACT

A method of controlling a transmission having a gearbox and a pump operable to circulate a fluid through the gearbox, includes sensing an acceleration of the vehicle, and adjusting an operating state of the pump. The operating state of the pump is adjusted to change the operating state of the pump from an initial operating state, to an adjusted operating state, when the acceleration of the vehicle is greater than an acceleration threshold. When the acceleration of the vehicle decreases from being greater than the acceleration threshold to being below the acceleration threshold, the operating state of the pump is returned to the initial operating state. The operating state of the pump may include a speed of the pump, a control signal representing a fluid flow rate for the current speed of the pump, or a fluid flow circuit for supplying the fluid to the pump.

19 Claims, 4 Drawing Sheets

METHOD OF CONTROLLING A TRANSMISSION DURING HIGH G-FORCE MANEUVERS

TECHNICAL FIELD

The disclosure generally relates to a method of controlling a transmission during high acceleration maneuvers.

BACKGROUND

Vehicle transmissions include a gearbox, and a pump that circulates fluid through the gearbox. The pump draws the fluid from a sump. Acceleration of the vehicle moves the fluid within the sump. If the vehicle acceleration is great enough, such as may occur during hard or fast turns or rapid acceleration or deceleration of the vehicle, the fluid may be moved away from an inlet to the pump, thereby causing low or no fluid flow through the pump, and noisy pump operation.

SUMMARY

A method of controlling a transmission of a vehicle is provided. The transmission includes a gearbox and a pump operable to circulate a fluid through the gearbox. The method includes sensing an acceleration of the vehicle with at least one accelerometer of the vehicle, and adjusting an operating state of the pump. The operating state of the pump is adjusted with a transmission control module of the vehicle. The operating state of the pump is adjusted to change the operating state of the pump from an initial operating state, to an adjusted operating state, when the acceleration of the vehicle is greater than an acceleration threshold.

A method of controlling a pump of a transmission is also provided. The transmission includes a gearbox, with the pump operable to circulate a fluid through the gearbox. The method includes sensing an acceleration of the vehicle with at least one accelerometer of the vehicle. The sensed acceleration includes a magnitude, and a direction relative to a longitudinal axis of the vehicle. A speed of the vehicle is sensed with a vehicle speed sensor. A maximum allowable pump speed is defined based on the sensed speed of the vehicle, with a transmission control module. When the acceleration of the vehicle is greater than an acceleration threshold, and when the sensed speed of the pump is equal to or greater than the maximum allowable pump speed for the sensed speed of the vehicle, the speed of the pump is reduced with the transmission control module. The speed of the pump is reduced to change the operating state of the pump from the sensed speed of the pump to an adjusted speed of the pump.

Accordingly, the transmission, and particularly different operating states of the pump, are controlled based on the current acceleration of the vehicle. If the acceleration of the vehicle is high enough and in a direction that may cause the fluid to move away from the inlet of the pump, the operating state of the pump is adjusted to reduce noise and/or provide more accurate information related to the amount of fluid being circulated by the pump. For example, the speed of the pump may be reduced during high acceleration to reduce noise, or a fluid flow circuit that supplies the fluid to the pump may be adjusted to maintain the supply of fluid to the pump. Additionally, a signal from the transmission control module, representing the amount of fluid that the pump is circulating, may be adjusted based on a current speed of the pump and a current acceleration of the vehicle, when the high acceleration of the vehicle reduces the amount of fluid available at the inlet to the pump, to improve accuracy of vehicle diagnostics, such as but not limited to a temperature calculation for an electric device e.g., electric motor.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
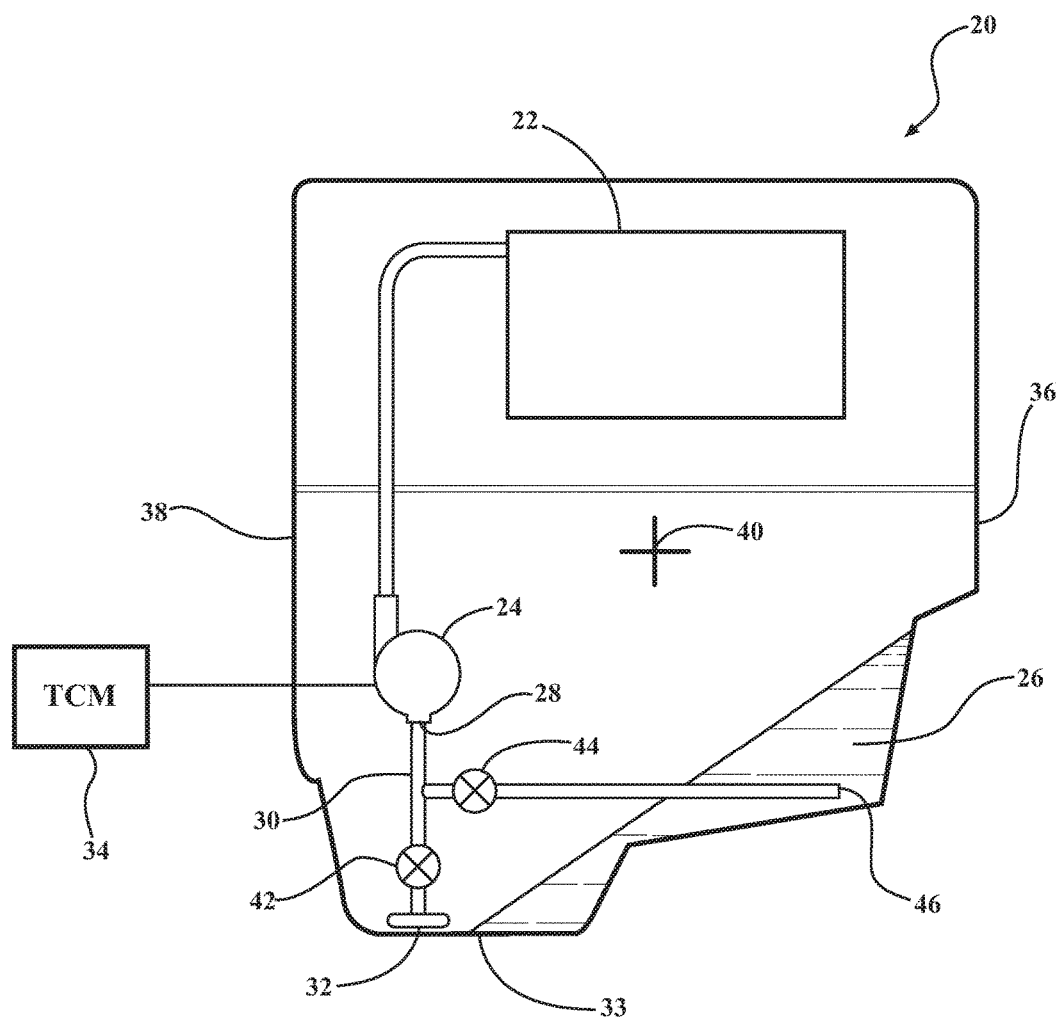
FIG. 1 is a schematic representation of a transmission of a vehicle.

Referring to the Figures, wherein like numerals indicate like parts throughout the several views, a method of controlling a transmission 20 of a vehicle is described herein. Referring to FIG. 1, the transmission 20 includes a gearbox 22 and a pump 24. The pump 24 is operable to circulate a fluid 26 through the gearbox 22. The pump 24 includes an inlet 28, and a fluid circuit 30 having an intake 32 that connects the inlet 28 of the pump 24 to the fluid 26 in a sump 33, and supplies the fluid 26 to the pump 24. The transmission 20, including the gearbox 22, the sump 33, and the fluid circuit 30, may be configured in any suitable manner. Accordingly, it should be appreciated that the schematic representation of the transmission 20 shown in FIG. 1 is provided for exemplary purposes to aid in understanding of the method described below.

The transmission 20 may optionally include an electric device (not shown), such as an electric motor or an electric motor/generator. The electric device may include a tractive motor that is used to provide a tractive for propulsive drive force, or may alternatively be used to generate electricity to charge an energy storage device. The electric device may be cooled by the fluid 26, with the pump 24 circulating the fluid 26 through the electric device for cooling.

The vehicle may include a transmission control module 34 that is operable to control the operation of the transmission 20. The transmission control module 34 may include a computer and/or processor, and include all software, hardware, memory, algorithms, connections, sensors, timer, etc., necessary to manage and control the operation of the transmission 20. As such, the method described below and generally shown in FIGS. 2 through 4, may be embodied as a program or algorithm operable on the transmission control module 34. It should be appreciated that the transmission control module 34 may include any device capable of analyzing data from various sensors, comparing data, making the necessary decisions required to control the operation of the transmission 20, and executing the required tasks necessary to control the operation of the transmission 20.

The transmission control module 34 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The transmission control module 34 includes tangible, non-transitory memory on which are recorded computer-executable instructions. The processor of the controller is configured for executing the computer-executable instructions to execute the method control the transmission 20 in the manner described below.

The method described below may be used to control the operation of the transmission 20 during high acceleration maneuvers, such as hard and fast turns, or sudden acceleration or deceleration of the vehicle. During such high acceleration maneuvers, the fluid 26 in the sump 33 may be moved away from the intake 32 of the fluid circuit 30 that supplies the fluid 26 to the pump 24. For example, referring to FIG. 1, the fluid 26 is shown moved toward a right side 36 of the sump 33 as viewed on the page of FIG. 1. As shown in FIG. 1, the intake 32 of the fluid circuit 30 is unable to draw the fluid 26 in because the fluid 26 is moved toward the right side 36 of the sump 33. This may be the result, for example, of a high speed turn to the left. In the situation shown in FIG. 1, the pump 24 is unable to circulate fluid 26 to the gearbox 22, and may draw in air, which may cause the pump 24 to emit excessive and undesirable noise. Additionally, because the pump 24 is unable to draw in the fluid 26 during the high acceleration maneuver, no fluid 26 is being circulated to the gearbox 22 for lubrication and/or cooling purposes. Furthermore, many vehicle control and/or diagnostic algorithms use the speed of the pump 24 to estimate a fluid 26 flow rate. These algorithms predict the fluid 26 flow rate based on the speed of the pump 24. However, if the pump 24 is unable to circulate the fluid 26, such as shown in FIG. 1, the pump 24 may be operating at a high speed, while not circulating any or very little fluid 26. Accordingly, the control and/or diagnostic algorithms that use the speed of the pump 24 to estimate the fluid 26 flow rate may be inaccurate during high acceleration maneuvers. The method described below provides a manner in which to control the transmission 20 during high acceleration maneuvers, to improve the operation of the transmission 20 during such high acceleration maneuvers.

Figure 2:
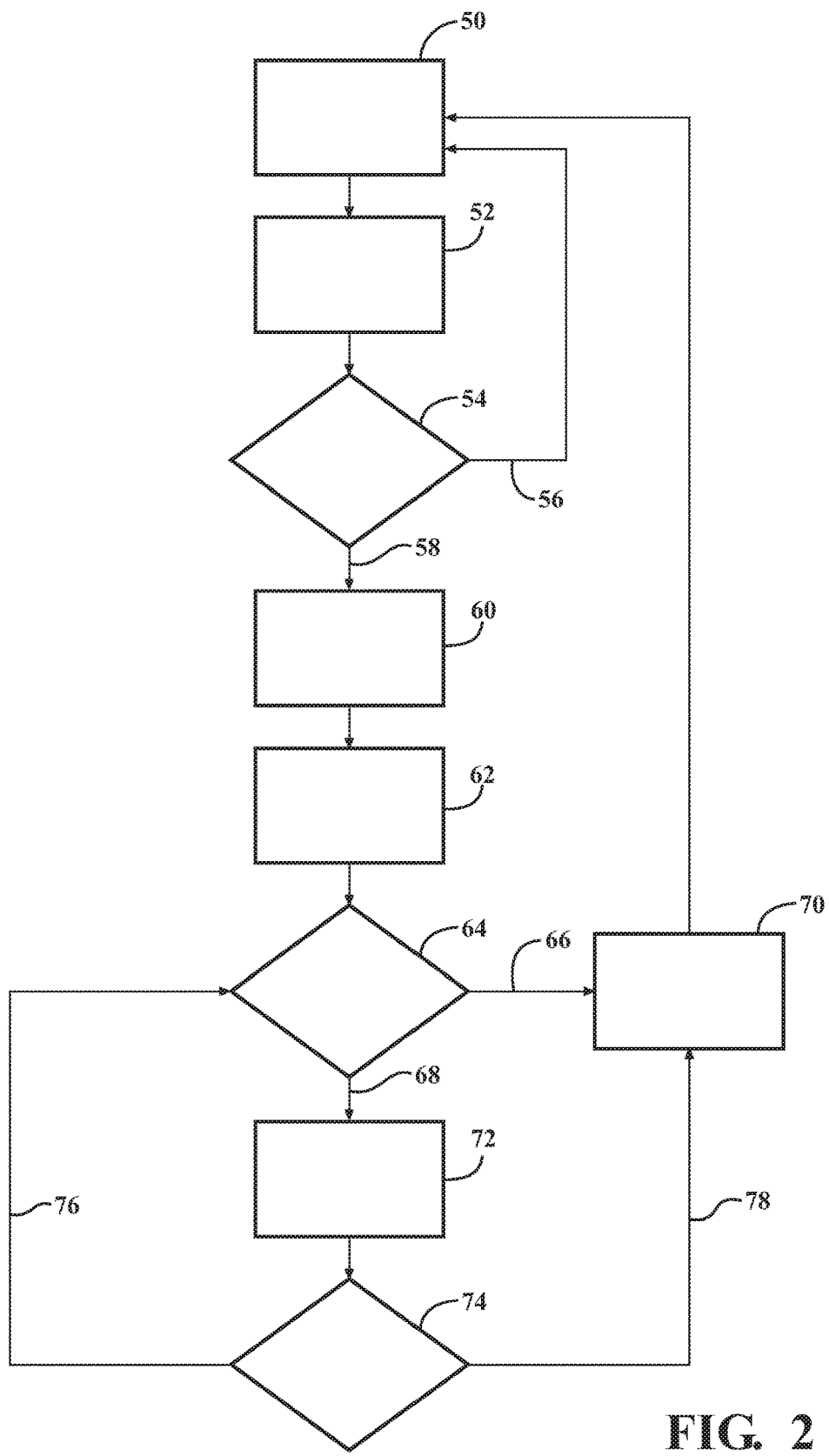
FIG. 2 is a flowchart representing a method of controlling the transmission during a high acceleration maneuver.

Referring to FIG. 2, the method includes sensing an acceleration of the vehicle, generally indicated by box 50. The acceleration of the vehicle may be sensed with at least one accelerometer of the vehicle. The acceleration of the vehicle includes a magnitude of the acceleration of the vehicle, and a direction of the acceleration force relative to a longitudinal axis 40 of the vehicle. For example, if the vehicle is making a hard right turn, the acceleration force may be directed toward the left side 38 of the longitudinal axis 40 of the vehicle. In contrast, if the vehicle is making a hard left turn, the acceleration force may be directed toward the right side 36 of the longitudinal axis 40 of the vehicle. If the vehicle is accelerating, the acceleration force may be directed toward the rear (not labeled) of the vehicle, and if the vehicle is decelerating, the acceleration force may be directed toward a front (not labeled) of the vehicle. The data from the accelerometers is communicated to the transmission control module 34, so that the transmission control module 34 may calculate and/or determine the magnitude and direction of the acceleration force. The sensing of the acceleration and the determination of the magnitude and direction of the acceleration force may be executed in a continuous manner, or at repeated specified time intervals.

The transmission control module 34 defines an acceleration threshold value, generally indicated by box 52. The acceleration threshold value is an acceleration magnitude of the vehicle, above which the transmission control module 34 may control the operation of the transmission 20. Accordingly, the acceleration threshold value represents a high acceleration maneuver. Vehicle maneuvers that generate an acceleration force having a magnitude that is equal to or greater than the acceleration threshold value may be considered high acceleration maneuvers, and vehicle maneuvers that generate an acceleration force having a magnitude that is less than the acceleration threshold value may not be considered high acceleration maneuvers. The acceleration threshold value may vary with the specific design of the transmission 20 and vehicle, and may be associated with a magnitude of the acceleration force that is sufficient to move the fluid 26 away from the intake 32 of the fluid circuit 30 that supplies the fluid 26 to the pump 24.

The acceleration threshold value may be a pre-defined value for all situations. Preferably however, the acceleration threshold value varies based on the direction of the acceleration force of the vehicle relative to the longitudinal axis 40 of the vehicle. Accordingly, due to the shape and/or configuration of the sump 33 for example, the acceleration threshold value for an acceleration force of a given magnitude in a first direction may differ from the an acceleration force of the same magnitude that is directed in a second direction. For example, a transmission 20 having a sump 33 having the intake 32 on the left side 38, such as shown in FIG. 1, may not be greatly affected by a high acceleration maneuver to the right side 36, because such a high acceleration maneuver forces the fluid 26 to the left side 38 of the longitudinal axis 40, and does not deprive the intake 32 of the fluid 26. However, a high acceleration maneuver to the left side 38 of the longitudinal axis 40, such as depicted in FIG. 1, moves the fluid 26 to the right side 36 of the longitudinal axis 40, and deprives the intake 32 of the fluid 26. Accordingly, the acceleration threshold value for a maneuver to the right side 36 may be defined to include a higher value than the acceleration threshold value for a maneuver to the left side 38.

Once the transmission control module 34 has sensed the magnitude of the vehicle's acceleration and the direction of the acceleration force, and defined the acceleration threshold value for the current direction of the acceleration force, the transmission control module 34 then compares the magnitude of the sensed acceleration of the vehicle to the acceleration threshold, generally indicated by box 54, to determine if the magnitude of the sensed acceleration of the vehicle is less than or equal to the acceleration threshold value, generally indicated at 56, or if the sensed acceleration of the vehicle is greater than the acceleration threshold value, generally indicated at 58.

When the magnitude of the sensed acceleration of the vehicle is less than or equal to the acceleration threshold value, generally indicated at 56, then no additional action is take, and the transmission control module 34 continues to monitor the acceleration of the vehicle. When the magnitude of the sensed acceleration of the vehicle is greater than the acceleration threshold value, generally indicated at 58, then the transmission control module 34 starts an event timer, generally indicated by box 60. The event timer may include, but is not limited to, a clock of the transmission control module 34. The event timer measures a duration of time commencing with the determination that the magnitude of the acceleration of the vehicle is greater than the acceleration threshold value. The transmission control module 34 continuously operates the event timer, measuring the time since the event timer was started, until either the magnitude of the acceleration of the vehicle decreases to a level below the acceleration threshold value, or until a time limit expires, described in greater detail below.

When the magnitude of the acceleration of the vehicle is greater than the acceleration threshold value, the transmission control module 34 may adjust one or more operating states and/or conditions of the pump 24, generally indicated by box 62. The transmission control module 34 may adjust the operating state of the pump 24 to change the operating state of the pump 24 from an initial operating state, to an adjusted operating state. The one or more operating states and/or conditions of the pump 24 may include, but are not limited to a speed of the pump 24, a control signal from the transmission control module 34 representing a fluid 26 flow rate of the pump 24, or the fluid circuit 30 providing the fluid 26 to the pump 24.

If the transmission control module 34 adjusts one or more of the operating states of the pump 24, because the magnitude of the acceleration of the vehicle is greater than the acceleration threshold value, then the transmission control module 34 continues to monitor the acceleration of the vehicle, generally indicated by box 64, to determine if the magnitude of the sensed acceleration of the vehicle is less than or equal to the acceleration threshold value, generally indicated at 66, or if the magnitude of the sensed acceleration of the vehicle is greater than the acceleration threshold value, generally indicated at 68. When the magnitude of the acceleration of the vehicle decreases from being greater than the acceleration threshold value, to being less than the acceleration threshold value, and the transmission control module 34 determines that the magnitude of the sensed acceleration of the vehicle is then less than or equal to the acceleration threshold value, generally indicated at 66, then the transmission control module 34 re-adjusts the operating state of the pump 24, generally indicated by box 70, to change or return the operating state of the pump 24 from the adjusted operating state, back to the initial operating state. The transmission control module 34 then continues to monitor the acceleration of the vehicle as described above.

When the transmission control module 34 determines that the magnitude of the sensed acceleration of the vehicle is still greater than the acceleration threshold value, then the transmission control module 34 maintains the adjustment to the operating state of the pump 24, generally indicated by box 72.

As noted above, the transmission control module 34 continuously operates the event timer, measuring the time since the event timer was started, until either the magnitude of the acceleration of the vehicle decreases to a level below the acceleration threshold value, or until the time limit expires. The time limit is an amount of time that the transmission control module 34 is allowed to adjust the operating state(s) of the transmission 20. In order to prevent the transmission control module 34 from adjusting the operating state(s) of the transmission 20 for excessively long periods of time, or in response to a faulty input, the adjustment of the operating state of the pump 24 is limited by the time limit. Accordingly, the transmission control module 34 continuously compares the measured duration of time that the operating state of the pump 24 is adjusted, i.e., since the event timer was started, to the time limit, generally indicated by box 74, to determine if the measured duration of time is less than the time limit, generally indicated at 76, or if the measured duration of time is equal to or greater than the time limit, generally indicated at 78. When the measured duration of time since the start of the event timer is less than the time limit, generally indicated at 76, then the transmission control module 34 maintains the adjustment to the operating state of the transmission 20, and continues to monitor the acceleration of the vehicle, generally indicated by box 64, to determine if or when the magnitude of the acceleration of the vehicle decreases to a level less than the acceleration threshold value.

When the measured duration of time since the start of the event timer is equal to or greater than the time limit, generally indicated at 78, then the transmission control module 34 re-adjusts the operating state(s) of the pump 24, generally indicated by box 70, to return the operating state of the pump 24 from the adjusted operating state, back to the initial operating state.

Adjusting the operating state of the pump 24 may include adjusting the initial operating state of the pump 24 by an adjustment value, to define the adjusted operating state of the pump 24. The adjustment value may vary based on the direction of the acceleration force of the vehicle relative to the longitudinal axis 40 of the vehicle. Accordingly, the amount that the operating state of the pump 24 is adjusted, i.e., the adjustment value, may vary depending upon which direction relative to the longitudinal axis 40 of the vehicle, the acceleration force is directed. As such, an acceleration force of a specific magnitude directed in a first direction relative to the longitudinal axis 40 of the vehicle may be adjusted by a different amount than an acceleration force of the same magnitude that is directed in a second direction relative to the longitudinal axis 40 of the vehicle. Furthermore, the adjustment value may vary based on the magnitude of the acceleration force of the vehicle. Accordingly, the amount that the operating state of the pump 24 is adjusted, i.e., the adjustment value, may vary depending upon the magnitude of the acceleration force. As such, an acceleration force of a specific magnitude may be adjusted by a different amount than an acceleration force having a different magnitude.

Figure 3:
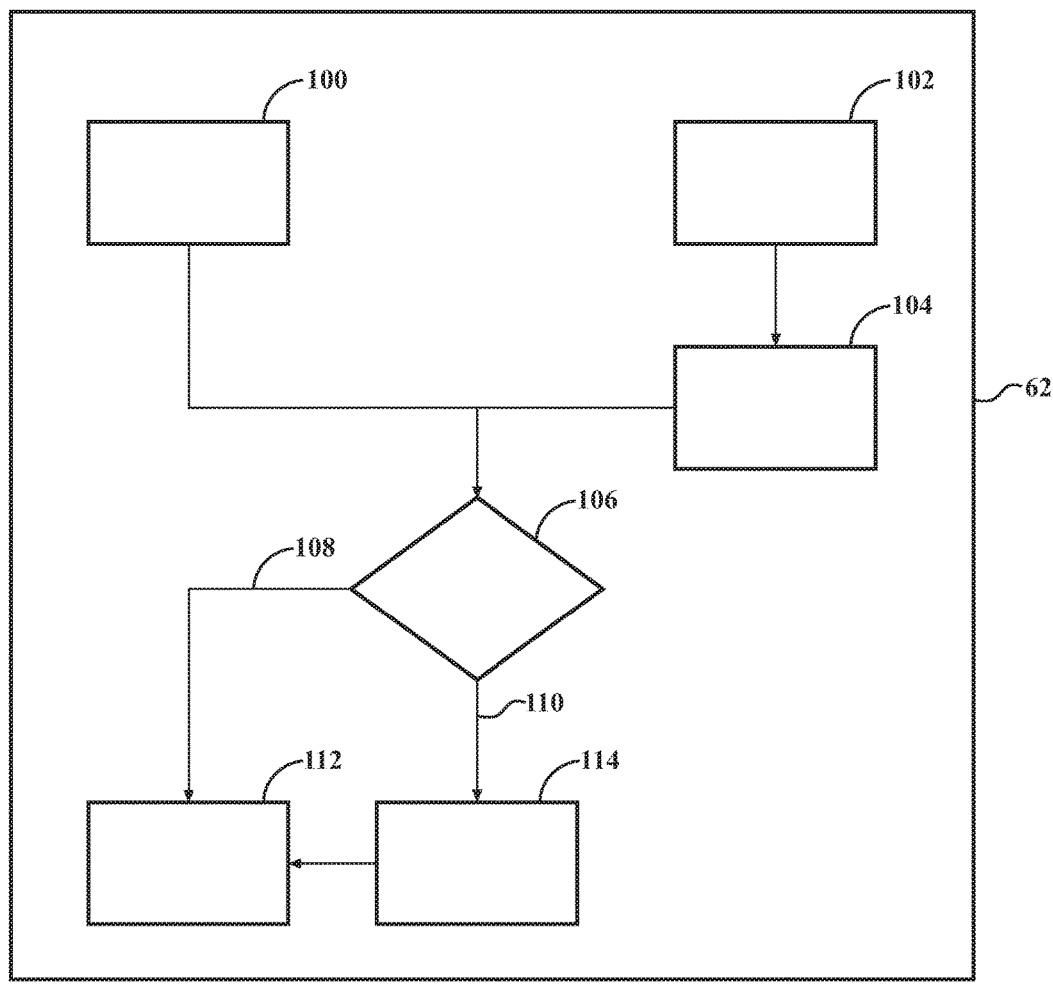
FIG. 3 is a flowchart representing a process of adjusting a speed of a pump of the transmission, as part of the process of controlling the transmission during the high acceleration maneuver.

Referring to FIG. 3, the process of adjusting the operating state of the pump 24, when the speed of the pump 24 is the operating state of the pump 24, is described. The process includes sensing a speed of the pump 24, generally indicated by box 100, with a rotational sensor, and sensing a speed of the vehicle generally indicated by box 102, with a speed sensor. The rotational speed of the pump 24 and the speed of the vehicle may be sensed in any suitable manner, with any suitable sensors, as is known in the art. The rotational speed of the pump 24 and the speed of the vehicle are communicated to the transmission control module 34.

The transmission control module 34 defines a maximum allowable pump 24 speed generally indicated by box 104. The maximum allowable pump 24 speed varies, and is dependent upon the sensed speed of the vehicle. The maximum allowable pump 24 speed defines a maximum rotational speed of the pump 24 that satisfies noise, vibration and harshness (NVH) requirements. Accordingly, the maximum allowable pump 24 speed may be defined as the fastest rotational speed of the pump 24 that is capable of satisfying the NVH requirements of the vehicle. It should be appreciated that the maximum allowable pump 24 speed may be defined to include any value, including a value of zero, i.e., complete stoppage of the pump 24.

Once the transmission control module 34 has defined the maximum allowable pump 24 speed for the current speed of the vehicle, the transmission control module 34 compares the sensed speed of the pump 24 to the maximum allowable pump 24 speed, general indicated by box 106, to determine if the sensed speed of the pump 24 is less than the maximum allowable pump 24 speed, generally indicated at 108, or if the sensed speed of the pump 24 is equal to or greater than the maximum allowable pump 24 speed, generally indicated at 110. When the sensed speed of the pump 24 is less than the maximum allowable pump 24 speed for the sensed speed of the vehicle, generally indicated at 108, then the transmission control module 34 may temporarily disable at least one diagnostic algorithm that uses the speed of the pump 24, generally indicated by box 112, because the high acceleration maneuver may prevent the pump 24 from circulating the fluid 26 through the gearbox 22 at the presumed fluid 26 flow rate associated with the current rotational speed of the pump 24.

When the sensed speed of the pump 24 is equal to or greater than the maximum allowable pump 24 speed for the sensed speed of the vehicle, generally indicated at 110, then the transmission control module 34 may then reduce the speed of the pump 24 to limit excessive noise from the pump 24, generally indicated by box 114. Additionally, when the sensed speed of the pump 24 is equal to or greater than the maximum allowable pump 24 speed for the sensed speed of the vehicle, then the transmission control module 34 may then temporarily disable at least one diagnostic algorithm that uses the speed of the pump 24, while the speed of the pump 24 is reduced, generally indicated by box 112.

Figure 4:
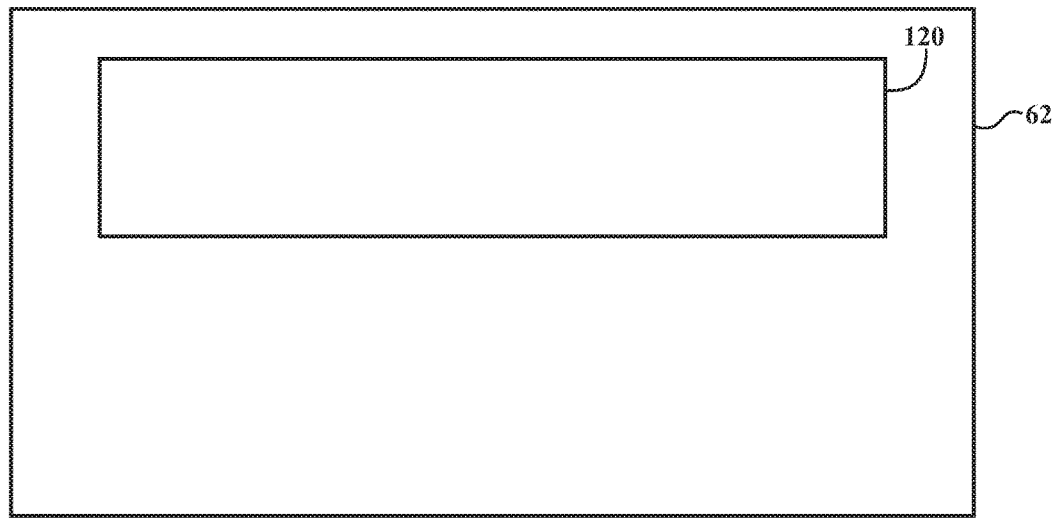
FIG. 4 is a flowchart representing a process of adjusting a control signal representing a flow rate of the pump, as part of the process of controlling the transmission during the high acceleration maneuver.

Referring to FIG. 4, the process of adjusting the operating state of the pump 24, when the control signal that is output from the transmission control module 34 representing the fluid flow estimate of the pump 24 is the operating state of the pump 24, is described. The control signal represents an estimate of the fluid flow from the pump 24 for the current speed of the pump 24. The process includes re-defining the control signal to include a value that represents an actual fluid 26 flow rate or estimate of the pump 24, generally indicated by box 120. Accordingly, it should be appreciated that the control signal is adjusted based upon the current speed of the pump 24 and the current acceleration of the vehicle. For example, higher rates of acceleration may be associated larger changes to the value of the control signal. For example, the signal that is output from the transmission control module 34 that represents the fluid 26 flow rate from the pump 24 may be adjusted to include a value of zero, even though the pump 24 is rotating at a speed that would otherwise provide a given amount of fluid 26 flow that is greater than zero. Accordingly, any control and/or diagnostic algorithms that receive and use the control signal from the transmission control module 34, will receive the adjusted control signal indicating zero fluid 26 flow through the pump 24, and may execute their operations and/or calculations accordingly. It should be appreciated that the control signal may be adjusted to define any value between and including the initial or current value of the control signal, and a value indicating zero flow. This process may be executed independently of adjusting the rotational speed of the pump 24, or in combination with adjustment to the rotational speed of the pump 24.

Figure 5:
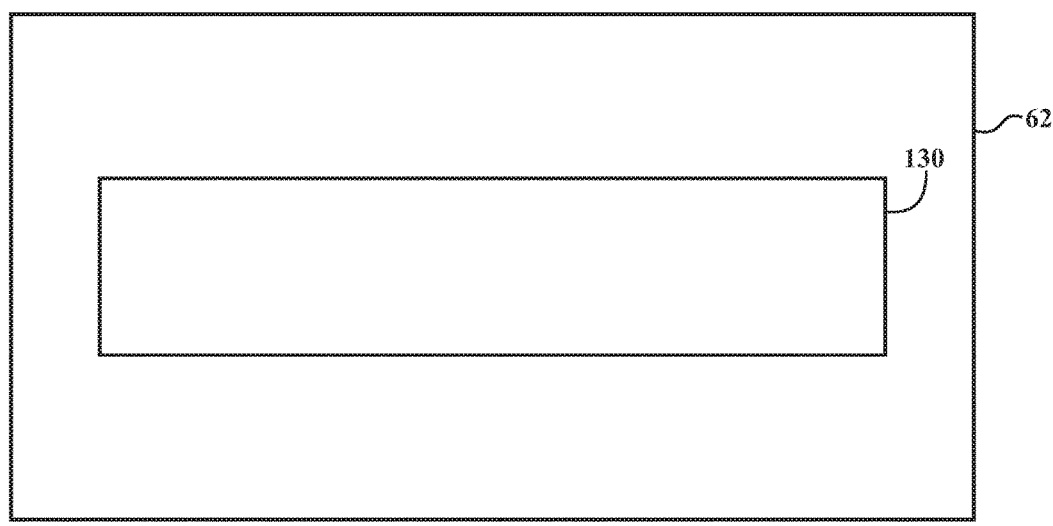
FIG. 5 is a flowchart representing a process of adjusting a fluid circuit of the transmission, as part of the process of controlling the transmission during the high acceleration maneuver.

Referring to FIG. 5, the process of adjusting the operating state of the pump 24, when the configuration of the fluid circuit 30 is defined as the operating state of the pump 24, is described. As shown in FIG. 1, the fluid circuit 30 includes the intake 32, which draws the fluid 26 into the fluid circuit 30 and supplies the pump 24 with the fluid 26. However, as shown in FIG. 1, the fluid 26 is moved away from the intake 32 due to a high acceleration maneuver. The fluid circuit 30 may include one or more control valves, one or more secondary intake 46 32s, and/or one or more secondary sump 33s (not shown). In order to supply the pump 24 with the fluid 26, the transmission control module 34 may adjust the configuration of the fluid circuit 30 to draw the fluid 26 from someplace other than the intake 32, or supply the intake 32 with the fluid 26. For example, as shown in FIG. 1, the transmission control module 34 may close a first valve 42, and open a second valve 44, so that the pump 24 draws the fluid 26 from a secondary intake 46 32. Accordingly, adjusting the operating state of the pump 24 includes opening or closing the at least one control valve, generally indicated by box 130, with the transmission control module 34 to re-direct or supply the fluid 26 flow through the fluid circuit 30 to maintain the flow of the fluid 26 to the pump 24.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a transmission of a vehicle, wherein the transmission includes a gearbox and a pump operable to circulate a fluid through the gearbox, the method comprising:

sensing an acceleration of the vehicle with at least one accelerometer of the vehicle; and adjusting an operating state of the pump, with a transmission control module, to change the operating state of the pump from an initial operating state to an adjusted operating state, when the acceleration of the vehicle is greater than an acceleration threshold;

wherein the operating state of the pump includes a control signal output from the transmission control module representing a fluid flow estimate of the pump, and wherein adjusting the operating state of the pump includes re-defining the control signal representing the fluid flow estimate of the pump based on a current speed of the pump and the sensed acceleration of the vehicle.

2. The method set forth in claim 1 wherein sensing the acceleration of the vehicle includes sensing a magnitude of the acceleration of the vehicle and a direction of the acceleration of the vehicle relative to a longitudinal axis of the vehicle.

3. The method set forth in claim 1 wherein the acceleration threshold includes a value that varies based on a direction of the acceleration of the vehicle relative to a longitudinal axis of the vehicle.

4. The method set forth in claim 1 wherein adjusting the operating state of the pump includes adjusting the initial operating state of the pump by an adjustment value to define the adjusted operating state of the pump, wherein the adjustment value varies based on a direction of the acceleration of the vehicle relative to a longitudinal axis of the vehicle.

5. The method set forth in claim 1 wherein adjusting the operating state of the pump includes adjusting the initial operating state of the pump by an adjustment value to define the adjusted operating state of the pump, wherein the adjustment value varies based on a magnitude of the acceleration of the vehicle.

6. The method set forth in claim 1 further comprising starting an event timer, with a clock of the transmission control module, when the sensed acceleration of the vehicle is greater than the acceleration threshold, to measure a duration of time that the operating state of the pump is adjusted.

7. The method set forth in claim 6 further comprising re-adjusting the operating state of the pump, with the transmission control module, to return the operating state of the pump from the adjusted operating state to the initial operating state, when the measured duration of time that the operating state of the pump is adjusted is equal to or greater than a time limit.

8. The method set forth in claim 1 wherein the operating state of the pump includes a speed of the pump, and wherein the method further comprises sensing a speed of the pump with a rotational sensor, and sensing a speed of the vehicle with a speed sensor.

9. The method set forth in claim 8 further comprising defining a maximum allowable pump speed, wherein the maximum allowable pump speed varies depending upon the sensed speed of the vehicle.

10. The method set forth in claim 9 wherein adjusting the operating state of the pump is further defined as reducing the speed of the pump when the sensed speed of the pump is equal to or greater than the maximum allowable pump speed for the sensed speed of the vehicle.

11. The method set forth in claim 10 further comprising temporarily disabling at least one diagnostic algorithm that uses the speed of the pump, with the transmission control module, while the speed of the pump is reduced.

12. The method set forth in claim 1 wherein the operating state of the pump includes a fluid circuit for supplying the fluid to the pump, and having at least one control valve actuated by the transmission control module, wherein adjusting the operating state of the pump includes opening or closing the at least one control valve with the transmission control module to re-direct fluid flow through the fluid circuit to maintain the flow of the fluid to the pump when the acceleration of the vehicle is greater than the acceleration threshold.

13. The method set forth in claim 1 further comprising re-adjusting the operating state of the pump, with the transmission control module, to change the operating state of the pump from the adjusted operating state to the initial operating state, when the acceleration of the vehicle decreases from being greater than the acceleration threshold to being less than the acceleration threshold.

14. A method of controlling a transmission of a vehicle, wherein the transmission includes a gearbox and a pump operable to circulate a fluid through the gearbox, the method comprising:
    sensing an acceleration of the vehicle with at least one accelerometer of the vehicle, wherein the sensed acceleration includes a magnitude and a direction relative to a longitudinal axis of the vehicle;
    sensing a speed of the vehicle with a vehicle speed sensor;
    defining a maximum allowable pump speed, with a transmission control module, based on the sensed speed of the vehicle;
    sensing an initial speed of the pump with a rotational sensor; and
    reducing the sensed initial speed of the pump, with the transmission control module, to change an operating state of the pump from the sensed initial speed of the pump to an adjusted speed of the pump, when the acceleration of the vehicle is greater than an acceleration threshold, and when the sensed initial speed of the pump is equal to or greater than the maximum allowable pump speed for the sensed speed of the vehicle.

15. The method set forth in claim 14 further comprising increasing the operating state of the pump, with the transmission control module, to change the speed of the pump from the adjusted speed to the sensed initial speed of the pump, when the acceleration of the vehicle decreases from being greater than the acceleration threshold to being less than the acceleration threshold.

16. The method set forth in claim 14 further comprising starting an event timer, with a clock of the transmission control module, when the sensed acceleration of the vehicle is greater than the acceleration threshold, to measure a duration of time that the speed of the pump is reduced to the adjusted speed.

17. The method set forth in claim 16 further comprising re-adjusting the speed of the pump, with the transmission control module, to return the speed of the pump from the adjusted speed back to the sensed initial speed of the pump, when the measured duration of time that the speed of the pump is reduced to the adjusted speed is equal to or greater than a time limit.

18. The method set forth in claim 14 further comprising re-defining a control signal output from the transmission control module representing a fluid flow estimate of the pump based on the sensed initial speed of the pump and the sensed acceleration of the vehicle, when the acceleration of the vehicle is greater than the acceleration threshold.

19. The method set forth in claim 14 wherein the transmission includes a fluid circuit operable to supply the fluid to the pump, and including at least one control valve actuated by the transmission control module, wherein the method further comprises opening or closing the at least one control valve with the transmission control module to re-direct fluid flow through the fluid circuit to maintain the flow of the fluid to the pump when the acceleration of the vehicle is greater than the acceleration threshold.

* * * * *